United States Patent
Vašíček et al.

[11] 3,912,220
[45] Oct. 14, 1975

[54] BALL VALVES

[75] Inventors: Zdeněk Vašíček; Jan Král, both of Dolni Benesov; František Štefek, Bohuslavice; Josef Halfar, Dolni Benesov; Drahomír Rosa, Bohuslavice, all of Czechoslovakia

[73] Assignee: Moravskoslezska Armaturka, Dolni Benesov, Czechoslovakia

[22] Filed: Oct. 11, 1973

[21] Appl. No.: 405,402

[30] Foreign Application Priority Data
Nov. 1, 1972  Czechoslovakia .................. 7357-72

[52] U.S. Cl. ................. 251/159; 251/177; 251/210
[51] Int. Cl. .............................................. F16k 5/06
[58] Field of Search ............ 251/159, 171, 172, 210

[56] References Cited
UNITED STATES PATENTS

| | | |
|---|---|---|
| 3,270,772 | 9/1966 | Rakus ............................. 251/315 X |
| 3,504,885 | 4/1970 | Hulsey ................................ 251/172 |
| 3,556,474 | 1/1971 | Scaramucci ......................... 251/172 |
| 3,610,569 | 10/1971 | Reaves ............................. 251/159 X |
| 3,746,303 | 7/1973 | Grove ................................ 251/159 |
| 3,765,440 | 10/1973 | Grove ............................. 251/172 X |

*Primary Examiner*—Harold W. Weakley

[57] ABSTRACT

A ball-type cock valve comprising a body housing and a rotatable spherical closing means. An axially movable seat means is mounted within the body housing in cooperative relationship with the spherical closing means. A pair of separate independent, primary and auxiliary sealing rings are disposed in the movable seat. Both of the sealing rings have overlaps extending outwardly from the surface of the seat in which they are located. One of the sealing rings is made of a material having a greater elasticity than the other so as to be more compressible.

9 Claims, 3 Drawing Figures

BALL VALVES

BACKGROUND OF INVENTION

The present invention relates to valves and more particularly to a ball type cock valve having an improved sealing means.

In industrial valves of relatively large size, such as, for example, ball-cock valves employed in long distance gas pipelines and the like, both functional reliability and long service life are required. However, in actual fact, in many of the valves of this type currently known and in use, excessive wear and failure of the sealing means placed between the valve closing member and the valve seat, located inside the body of the valve, are fundamental reasons for the generally short service life of such devices.

In order to overcome the stated disadvantage and increase the service life of valves of such construction, an additional sealing medium such as grease, for example, is introduced into the sealing space. However, this is disadvantageous since it necessitates the presence of a foreign pressurized medium and sealing medium in the interior of the valve.

In other known constructions, two independent sealing means are utilized, each being fixed respectively in an axially shiftable ring, each of which is forced by a spring in a direction toward the closing member. In such construction, the contact surfaces of both of the sealing means are provided with longitudinal grooves. In case the sealing ability of the first or inner sealing means fails, the pressure medium passes from the functional space of the valve to the area behind the axially shiftable means and is sealed off by the second or outer sealing means while increasing its thrust against the sealed functional surface of the closing member.

Such construction, however, results in increased manufacturing steps and costs, since two independent mutually shiftable rings, as well as sealing means therefor must be provided. Moreover, the resulting valve is of a much more complex construction, containing more movable parts and consequently is more likely to be subject to operational failure. Furthermore, the effectiveness of valves of such construction depends primarily upon the over pressure or excess pressure of the medium passing through the valve. There exists therefore a need for a ball-type cock valve construction which does not have the disadvantages set forth above.

It is therefore a primary object of this invention to provide a valve having an increased service life.

It is another object of the present invention to provide a valve of relatively simplified but reliable construction.

It is still a further object of the present invention to provide a sealing means for a valve particularly of the ball-type cock valve.

It is still another object of the invention to provide a valve having two independent sealing means, one of which is made of the material having a greater elasticity and coefficient of friction than the other.

Other objects and advantages of the present invention will be apparent from the following description thereof, which is to be taken in conjunction with the accompanying drawings.

SUMMARY OF THE INVENTION

In accordance with the present invention there is provided a valve, particularly a ball-type cock valve comprising a body housing and a rotatable spherical closing means. An axially movable seal means is mounted within the body housing in cooperative relationship with the spherical closing means. A pair of separate independent, primary and auxiliary sealing rings are disposed in the movable seat. Both of the sealing rings have overlaps extending outwardly from the surface of the seat in which they are located. One of the sealing rings is made of a material having a greater elasticity than the other so as to be more compressible.

Preferably, the overlap or extension from the surface of the seat, of the primary seal ring, which is also the one which is preferably more compressible, is greater so that the major seal effect is produced by the primary seal ring, which also acts to protect the auxiliary seal against the medium in the valve. The auxiliary seal is used to define the degree of compression and is effective as a seal in conjunction with or in the absence of the first seal.

In the preferred form of the invention the movable seat is made of two parts, each separable from the other. The seal rings are disposed respectively in each of the parts, enabling quick and easy dismantling and replacement of one seal without the replacement of the other.

DESCRIPTION OF THE INVENTION

It is to be understood that various standard elements or means well known in the art of valve construction are either schematically shown or not shown or described in detail. Only those elements which are necessary in providing a complete and adequate description of the present invention are described. The remaining would be obvious to those skilled in the present art.

Figure 1:
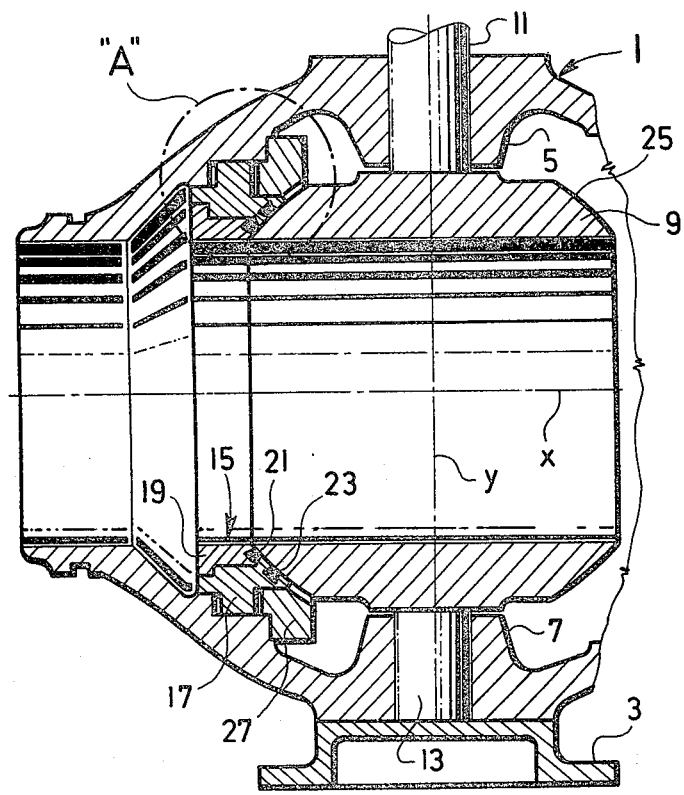
FIG. 1 is a schematic representation in sectional elevation of a ball-type cock valve having an axially movable seat.

Turning to FIG. 1, a ball-type cock valve of spherical shape is schematically shown in which the valve comprises a body, generally designated by the numeral 1. The valve defines a flow passage, the central longitudinal axis of which is identified by the letter X. The body is supported on a support or base plate 3.

The body 1 is made up of an upper hub 5 and a bottom hub 7. A rotary closing means comprising a spherical or ball member 9 having a vertical shaft 11 and a pin 13 affixed thereto is located in the body and is journaled in the upper and lower hubs 5 and 7 respectively so as to be rotatable about a vertical axis Y. An axially movable seat generally designated by the numeral 15 is located within the body to move in an axial direction in opposition to the surface of the ball member. The seat comprises an outer annular body portion 17, and an inner body portion 19, each having a functional surface along their edges adjacent the ball member 9. The functional surfaces are designated jointly by the numeral 20 and lies at an angle conically to the central axis X. A primary seal ring 21 is embedded or fixed inside the inner seat portion 19 and an auxiliary sealing ring 23 is embedded or fixed inside of the primary seat portion 17. The seals 21 and 23 are adapted to bear against the functional surface 25 of the rotary ball closing member 9 which surface 25 lies at an angle parallel to and is opposed to the functional surface 20 of the seat means. A cover 27 closes the space between the seat means 15 and the body 1. Consequently, a front chamber 29 is formed by the body 1 and the side of the seat means of the main annular ring 17 and a rear chamber 31 is formed by the opposite side of the extending portion of the main annular ring 17 of the seat means and the cover member 27 as shown more particularly in FIGS. 2 and 3.

A first duct 33 is formed in the body which opens into the front chamber and a second duct 35 formed parallel to it opens into the rear chamber 31. The ducts 33 and 35 are connected to a suitable source of fluid under elevated pressure and valve regulating means selectively permitting the flow of such fluid into the front chamber 29 and the rear chamber 31 respectively. It is to be observed that the interior of the valve body 1 is provided with a plurality of annular steps or shoulders to which the outer circumference of the seat means (i.e., the main portion 17 and the cover 27) conform and slidingly engage. In this manner the seat means is axially movable while being restricted in radial movement with respect to the central axis X. At the same time the seat means is cooperative with the body 1 to form and maintain the separate chambers 29 and 31.

Figure 2:
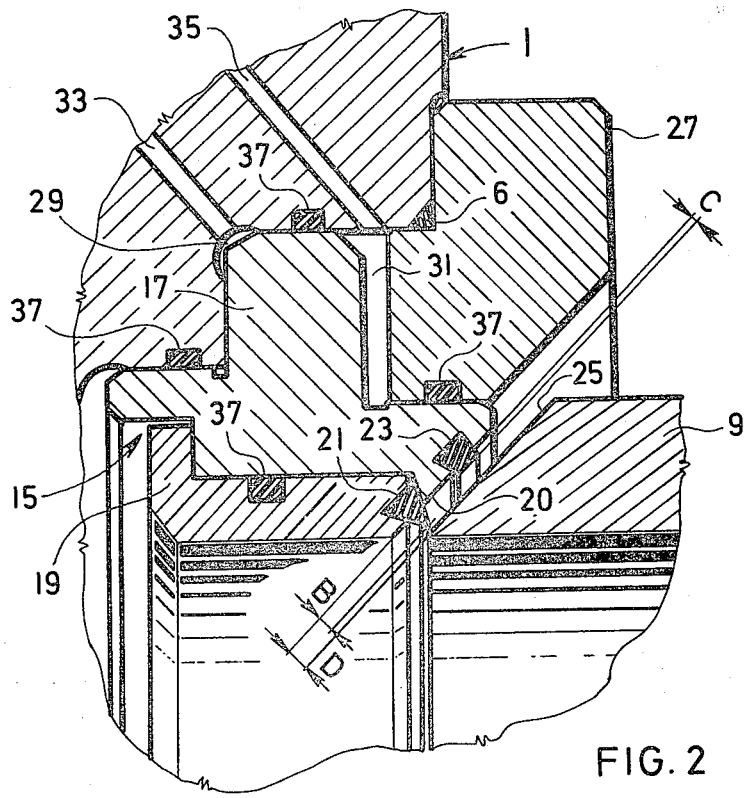
FIG. 2 is a schematic representation in sectional elevation of the valve, showing in detail the area designated "A" in FIG. 1 and illustrating the condition wherein the seat is at the greatest distance from the closing member.
Figure 3:
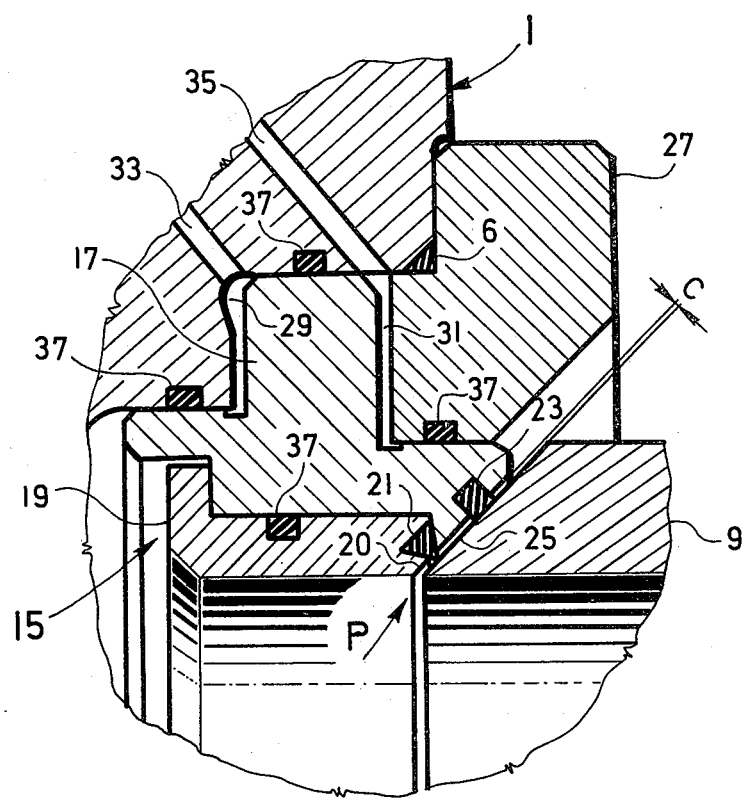
FIG. 3 is an illustration of the detailed area "A" shown in FIG. 1 when the valve seat is in operating position.

The ball member 9 is mounted in the body 1 so that it remains fixed against axial movement. The seat means 15 however is adapted to move axially from an extreme left position as seen in FIG. 2 to an extreme righthand position as seen in FIG. 3. The functional surfaces 20 and 25 remain parallel to each other during such movement. The maximum distance at which the seat means and thus the surface 20 can be moved from the functional surface 25 of the ball member 9 is indicated by the letter "D" in FIG. 2.

The primary sealing ring 21 is triangular or conical in cross section and is provided with a projecting apex or overlap extending outwardly from the surface 20 by a distance "B" while the auxiliary sealing ring 23 is generally square or rectangular in cross section and is provided with a projection or overlap extending outwardly from the surface 20 by a distance "C" as shown in FIG. 2. Both the distances B and C are chosen so that the overlap or projection B of the primary sealing ring 21 is greater than the projection C of the auxiliary sealing ring when they are in an uncompressed condition and the axially movable seat means is at its greatest distance from the closing member. However, the projections or overlaps extend to a distance less than the maximum distance D formed between the functional surfaces 20 and 25 when the seat means is in the furthest position from the ball member 9 as seen in FIG. 2. The auxiliary sealing ring 23 is made of a material which has less elasticity and a smaller coefficient of friction than rubber. It may be made, for example, of Teflon or any other suitable material which meets the elastic and frictional requirements mentioned. The primary sealing ring 21 is made of rubber, or similar material, more elastic and having a greater coefficient of friction than the auxiliary seal ring.

The means or elements for joining portions 17 and 19 of the seat body 15, as well as for joining the cover 27 and the body 1 are not shown since any suitable means or manner well known in the art can be utilized. In essence, however, the outer or main annular portion 17 and the inner secondary portion 19 are shiftable jointly with respect to the body 1 and the cover 27. Preferably the inner annular portion 19 is separable from the outer portion 17 so that the primary seal ring 21 may be easily replaced, independently of the auxiliary seal ring 23. The outer and inner portions 17 and 19 may thus be screwed or otherwise keyed together. The cover 27 similarly may be screwed, bolted or keyed to the body 1. O rings 37 or similar sealing means are provided to insure tight sealing of the chamber 29 and 31 as well as tight sealing of the shiftable parts mentioned above.

The valve is shown in operating condition in FIG. 3. To arrive at this operative condition a pressure medium from a suitable source (not shown) is supplied via the first duct 33 into the front chamber 29, thereby causing the seat means 15 to shift axially along the X axis and toward the rotary closing ball member 9. The pressure is chosen so that the primary sealing ring 21 deforms in contact with the functional surface 25 to such an extent that the auxiliary sealing rings 23 also contacts and presses against the surface 25 to hold against the ball member 9. The surfaces being spaced at this point a distance equal to the projection C. This condition being shown in FIG. 3. Thus the required sealing of the rotary closing ball member 9 is achieved by compression of the primary seal ring 21 and the joint engagement of the secondary seal ring 23. When requirement necessitates changing the position of the rotary closing valve ball member 9, pressurized media is introduced into the rear chamber 31 through the duct 35 and the seat means 15 shifts to the left to be returned to the position illustrated in FIG. 2. The rotary ball member 9 may then be rotated about the axis Y on the shaft 11 and pin 13, after which introduction of fluid into the front chamber 29 is made to again cause the seat 15 to shift axially engaging the sealing means 21 and 23.

In the event that the major sealing ring 21 fails to provide a tight seal with the rotating closing ball 9 such as might result from its excessive wear or its tearing loose from its fixed location on the seat member, because of failure to supply the pressure medium into the rear chamber 31 during manipulation of the rotary closing ball member 9, the auxiliary sealing ring 23 which is relatively more durable and slidable provides the necessary seal with the surface 25. Moreover since the auxiliary ring 23 is made of material having less elasticity and has a smaller coefficient of friction than the primary sealing ring, the auxiliary sealing ring permits the rotary manipulation of the closing member even if its separation from the functional surface thereof does not occur. Furthermore, longer service life of the sealing members are achieved because of the greater projection or overlap of the primary sealing ring 21 which allows the auxiliary sealing ring 23, at the moment when the seat starts to separate from the closing member to be protected from the unfavorable effects of any rapidly flowing media carried through the valve from the not shown piping, in the direction of arrow P seen in FIG. 3. Thus even at the beginning of the separation of the seating means from the ball member, the medium flowing through the valve, which even under the best of conditions carries a certain amount of impurities and seeks to flow through the very narrow gap P between the functional surfaces 20 and 25 at a very high speed, will not because of the expansion of the primary seal ring 21 attack the auxiliary seal member 23. While the flow of such media results in very harsh treatment to the sealing surface of the primary seal ring 21 it does not attack the auxiliary seal ring 23 which is protected until the primary sealing ring 21 is either fully damaged or completely torn from its location.

The present invention presents numerous advantages. For example, a valve having an improved although relatively simple sealing means is achieved. The sealing means has a long useful life. The valve according to the invention has relatively few moving parts and is simple to manufacture in as few number of manufacturing steps as possible. Moreover, the sealing means may be adapted to a wide variety of valves and the position of the primary and auxiliary sealing rings can be interchanged, and the primary sealing ring located outside of the sealing ring in the direction of the flow passage. Numerous other advantages of this invention will be readily apparent to those skilled in the art.

It is to be understood that many variations of this invention can be made without departing from the spirit and scope thereof. Therefore the invention is not to be limited to the disclosed embodiment thereof except as defined in the appended claims.

What is claimed is:

1. A valve comprising a body, an adjustable valve closing member located in said body, and seat means located in said body, said seat means having a planar functional surface lying in opposition to said valve closing member and being movably axially into cooperative relationship therewith to seal against the flow of fluid therethrough, a primary and an auxiliary sealing ring disposed independently in said seat means and spaced from each other, said primary sealing ring normally extending outwardly from the surface thereof by a first distance, said auxiliary sealing ring normally extending outwardly from the surface thereof by a second distance different from said first distance and one of said sealing rings having a greater elasticity than the other.

2. The valve according to claim 1 wherein said seat means comprises a main portion and a second portion separable therefrom, said portions being aligned to provide said planar functional surface, said primary and auxiliary seal rings being disposed in each of said portions respectively.

3. The valve according to claim 1 wherein said body has an axial passage and said closing member comprises a spherical element rotatable about an axis perpendicular to said passage, said seat means being movable along an axial path into engagement with the periphery of said spherical element.

4. A valve according to claim 3 wherein the rotatable spherical element includes shaft means and pin means journaled in said body and the spherical element is rotatable about an axis at right angles to the longitudinal axis of said valve.

5. A valve according to claim 1 wherein the extension of the primary seal ring is less than the size of the gap between the surface of the seat means and the valve closing member.

6. A valve according to claim 1 wherein the body is provided with a pair of ducts, one of said ducts opening into a chamber into the interior of said body formed by one side of said seat means and said body, the other of said ducts opening into a chamber in the interior of said body formed by the opposite side of seat means and said body and a cover located within said body between said body, said seat means and said closing means.

7. A valve according to claim 1 wherein the auxiliary seal ring is made of material having less elasticity and a smaller coefficient of friction than rubber.

8. A valve as defined according to claim 7 wherein the auxiliary seal ring is made of Teflon.

9. The valve according to claim 1 wherein said seat means defines with said valve body a double acting piston and cylinder arrangement.

* * * * *